United States Patent
Nonaka et al.

(10) Patent No.: US 11,824,426 B2
(45) Date of Patent: *Nov. 21, 2023

(54) MOTOR COOLING MEMBER

(71) Applicant: Taiho Kogyo Co., Ltd., Toyota (JP)

(72) Inventors: Terumi Nonaka, Toyota (JP); Daisuke Shikanai, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,191

(22) Filed: Mar. 2, 2023

(65) Prior Publication Data

US 2023/0208254 A1    Jun. 29, 2023

Related U.S. Application Data

(63) Continuation of application No. 16/915,353, filed on Jun. 29, 2020, now Pat. No. 11,632,018.

(30) Foreign Application Priority Data

Jul. 30, 2019    (JP) .................................. 2019-139428

(51) Int. Cl.
*H02K 9/19*    (2006.01)

(52) U.S. Cl.
CPC ...................... *H02K 9/19* (2013.01)

(58) Field of Classification Search
CPC .. H02K 9/16; H02K 9/19; H02K 9/18; H02K 9/197; H02K 9/20; H02K 9/06;

(Continued)

(56) References Cited

U.S. PATENT DOCUMENTS 5,557,153 A * 9/1996 Zimmermann .......... H02K 9/06
                                                    310/58
11,632,018 B2 * 4/2023 Nonaka .................... H02K 9/19
                                                    310/54

(Continued)

FOREIGN PATENT DOCUMENTS

EP    2760113 A1    7/2014
EP    3121938 A1    1/2017

(Continued)

OTHER PUBLICATIONS

Office Action issued in corresponding German Patent Application No. 10 2020 004 124.8, dated Sep. 27, 2021, with English Translation, 15 pages.

(Continued)

*Primary Examiner* — Bryan R Perez
(74) *Attorney, Agent, or Firm* — BUCHANAN INGERSOLL & ROONEY PC

(57) ABSTRACT

The motor cooling member includes: an oil feed port to which oil is fed; a plurality of discharge ports that discharge oil toward a motor; a basis oil passage connected to the oil feed port; and a plurality of derived oil passages each of which is formed by branching from the basis oil passage so as to correspond to each of the plurality of discharge ports and is formed so as to connect the basis oil passage to each of the discharge ports, and which are formed in different shapes from each other.

12 Claims, 9 Drawing Sheets

(58) Field of Classification Search
CPC .. H02K 9/14; H02K 5/20; H02K 5/02; H02K 5/04; H02K 5/08; H02K 41/031; H02K 1/193; H02K 1/32; H02K 1/20
See application file for complete search history.

(56) References Cited

U.S. PATENT DOCUMENTS

| | | |
|---|---|---|
| 2010/0052441 A1 | 3/2010 | Fukushima |
| 2014/0175920 A1* | 6/2014 | Cimatti ................. H02K 5/203 |
| | | 310/54 |
| 2021/0036581 A1 | 2/2021 | Nonaka et al. |

FOREIGN PATENT DOCUMENTS

| | | |
|---|---|---|
| JP | 5347380 B2 | 8/2008 |
| JP | 2010130794 A | 6/2010 |
| JP | 2014107905 A | 6/2014 |

OTHER PUBLICATIONS

Notice of Reasons for Refusal issued in Japanese Patent Application No. 2019-139428, dated Aug. 23, 2022, with English Translation, 7 pages.

* cited by examiner

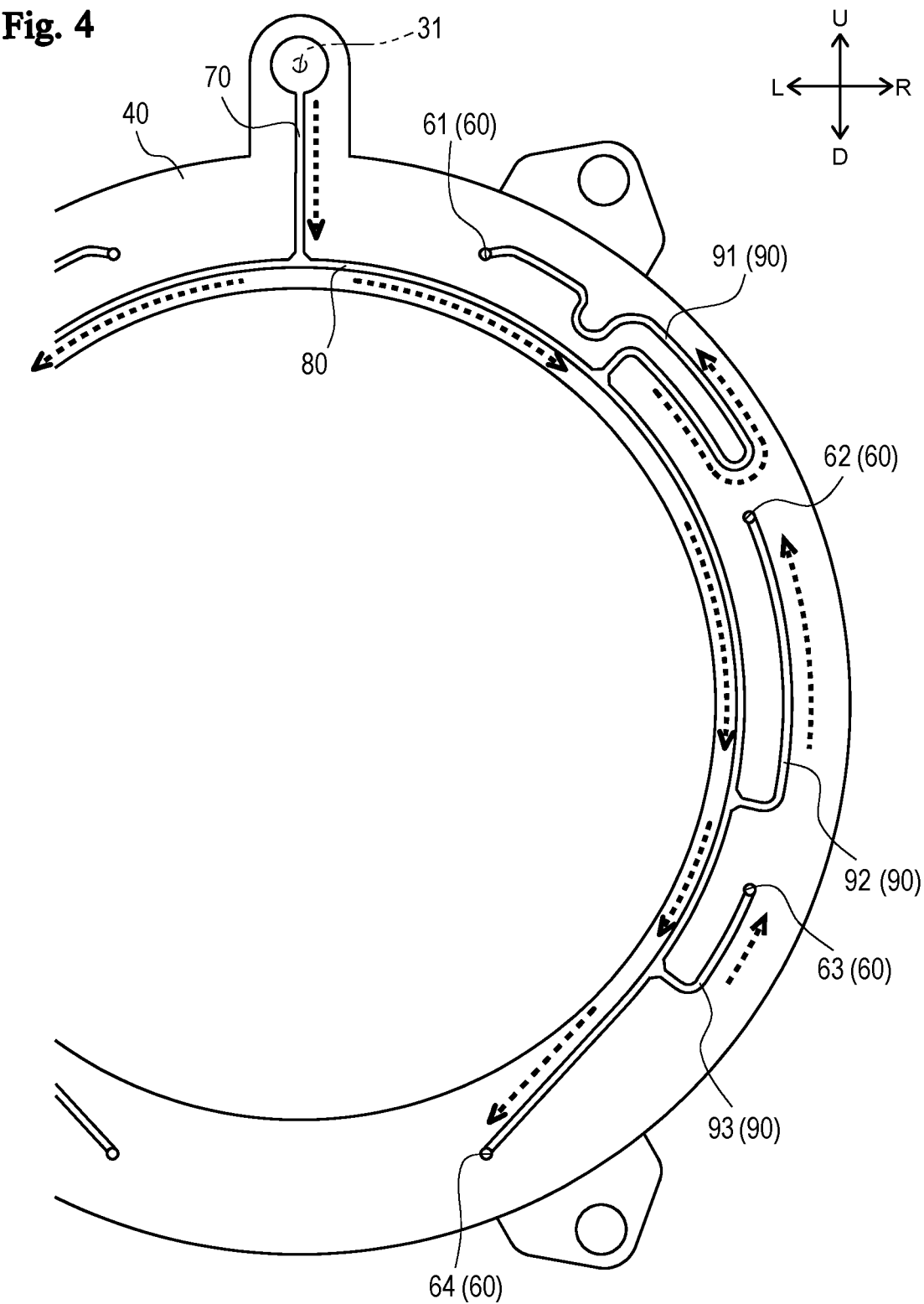

MOTOR COOLING MEMBER

RELATED APPLICATIONS

The present application is a continuation of U.S. Ser. No. 16/915,353, filed on Jun. 29, 2020, and which claims the priority of JP 2019-139428, which was filed on Jul. 30, 2019. The entire contents of U.S. Ser. No. 16/915,353 and JP 2019-139428 are incorporated herein by reference.

TECHNICAL FIELD

The present disclosure relates to a technique of a motor cooling member that can feed oil to and cool a motor.

BACKGROUND ART

Conventionally, a technique related to a structure for feeding oil to and cooling a motor has been known. For example, the technology is described in JP 5347380 B2.

JP 5347380 B2 describes an oil cooling structure of motor that cools a coil by injecting oil toward the coil of the motor. Specifically, an annular peripheral oil passage extending along a peripheral direction of the motor is formed in an inner side surface of a housing of the motor described in JP 5347380 B2. Further, a plurality of injection holes for injecting the oil flowing through the peripheral oil passage toward the coil are formed in a member (oil passage cover) that covers the peripheral oil passage. In the oil cooling structure described in JP 5347380 B2, the oil flowing through the peripheral oil passage is discharged from the plurality of injection holes to the coil, and thereby the coil is cooled.

However, according to the technique described in JP 5347380 B2, the oil fed from an oil inlet port that communicates with a part of the peripheral oil passage flows through the peripheral oil passage. As the oil flows through the peripheral oil passage, a pressure loss of the oil increases. Therefore, an injection pressure of the oil becomes lower for an injection hole located farther from the oil inlet port, and a discharge amount of oil from the injection hole decreases. As described above, in general, the discharge amount of oil changes depending on an oil flow path, and therefore, a technique for arbitrarily adjusting the discharge amount is required.

SUMMARY OF INVENTION

The present disclosure has been made in view of the above circumstances, and a problem to be solved is to provide a motor cooling member that can arbitrarily adjust an amount of oil discharged from a plurality of discharge ports.

The problem to be solved by the present disclosure is as described above, and hereinafter, means for solving the problem is described.

A motor cooling member according to the present disclosure includes: an oil feed port to which oil is fed; a plurality of discharge ports that discharge oil toward a motor; a basis oil passage connected to the oil feed port; and a plurality of derived oil passages, each of the plurality of derived oil passages being formed by branching from the basis oil passage so as to correspond to each of the plurality of discharge ports and being formed so as to connect the basis oil passage to each of the discharge ports, and the plurality of derived oil passages being formed in different shapes from each other.

In the motor cooling member according to the present disclosure, the plurality of derived oil passages are formed in shapes such that the pressure loss of the oil that flows increases as a distance from the oil feed port decreases.

In the motor cooling member according to the present disclosure, the plurality of derived oil passages differ from each other in at least one of a length in an oil flow direction, a number of flexures, and a cross-sectional shape perpendicular to the oil flow direction.

In the motor cooling member according to the present disclosure, the plurality of discharge ports are disposed so as to face an axial end surface of the motor, and are disposed at different positions in a radial direction of the motor.

In the motor cooling member according to the present disclosure, the plurality of discharge ports are disposed so as to face a radially outer side surface of the motor.

The present disclosure has the following effects.

In the motor cooling member according to the present disclosure, the amount of oil discharged from the plurality of discharge ports can be arbitrarily adjusted.

In the motor cooling member according to the present disclosure, the amount of oil discharged from the plurality of discharge ports can be equalized.

In the motor cooling member according to the present disclosure, a difference can be provided between the pressure losses in the plurality of derived oil passages.

In the motor cooling member according to the present disclosure, the motor can be cooled at an arbitrary position.

In the motor cooling member according to the present disclosure, the motor can be cooled from a side surface of the motor.

BRIEF DESCRIPTION OF DRAWINGS

FIG. 4 is a front view showing oil passages formed in a second plate part and a flow of oil flowing through the oil passages;

DESCRIPTION OF EMBODIMENTS

Figure 1:
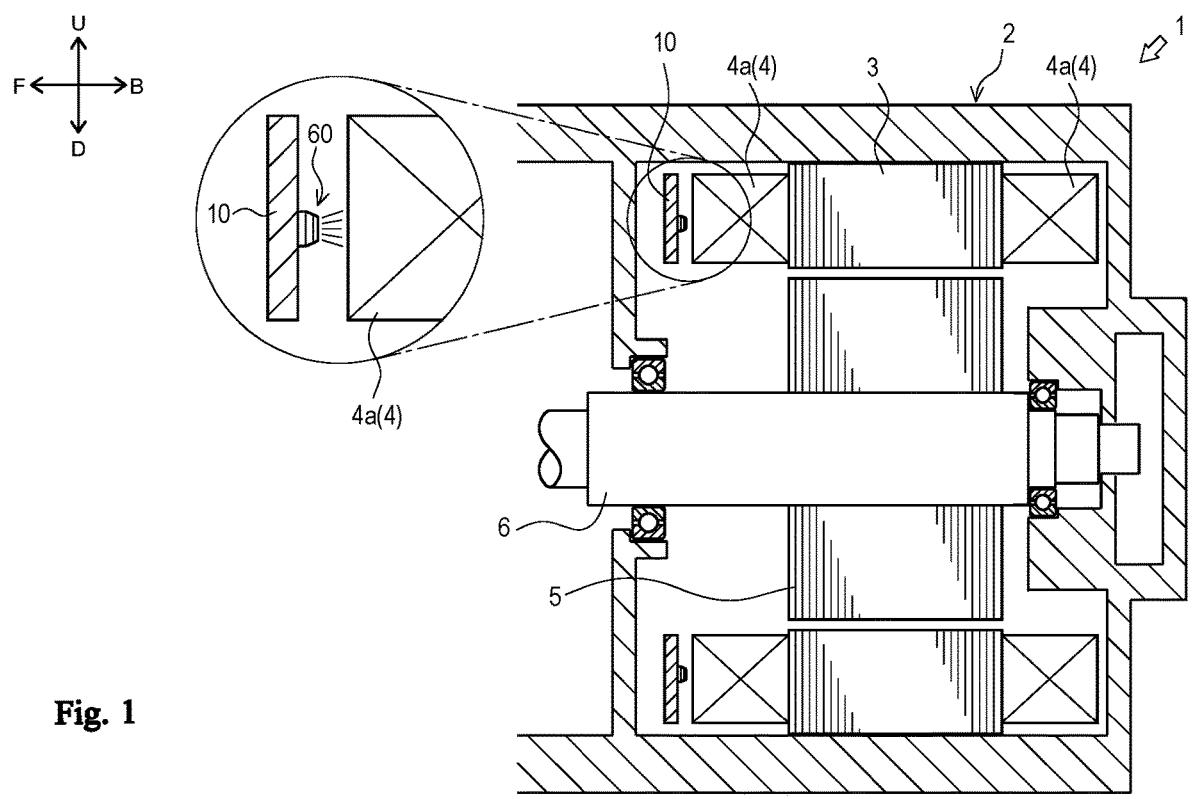
FIG. 1 is a schematic cross-sectional view of a motor including a cooling member according to a first embodiment.

In the following, a description is made after defining directions indicated by arrows U, D, F, B, L and R in the drawings as upward, downward, forward, backward, leftward, and rightward directions, respectively.

First, an outline of a configuration of a motor 1 including a cooling member 10 according to a first embodiment of the present disclosure is described with reference to FIG. 1.

The motor 1 according to the present embodiment is used for a driving device of an automobile (a hybrid vehicle (HV), an electric vehicle (EV), or the like). The motor 1 mainly includes a housing 2, a stator 3, a coil 4, a rotor 5, a rotating shaft 6, and a cooling member 10.

The housing 2 accommodates other members (the stator 3 and the like) constituting the motor 1. The stator 3 is fixed inside the housing 2. The stator 3 is formed in a substantially cylindrical shape. The stator 3 is disposed with an axis of the stator 3 oriented in the front-back direction. A conductive wire is wound around the stator 3 to form the coil 4. The coil 4 is formed in a cylindrical shape concentric with the stator 3. Both ends of the coil 4 (hereinafter, referred to as "coil ends 4*a*") are disposed so as to protrude from both ends of the stator 3.

The rotor 5 is formed in a substantially cylindrical shape. The rotor 5 is disposed inside the stator 3. The rotor 5 is disposed with an axis of the rotor 5 oriented in the front-back direction. The rotating shaft 6 is provided so as to penetrate the center of the rotor 5 with an axis of the rotating shaft 6 oriented in the front-back direction. The rotating shaft 6 is rotatably provided in the housing 2 while interposing a bearing between the rotating shaft 6 and the housing 2. The rotor 5 and the rotating shaft 6 are disposed on the same axis (concentrically) as the stator 3 and the coil 4.

The cooling member 10 cools the coil 4 by feeding oil to the motor 1 (the coil 4 in the present embodiment). The cooling member 10 is formed in a substantially annular plate shape. The cooling member 10 is disposed so as to be substantially perpendicular to an axis of the motor 1. Thereby, the cooling member 10 is disposed so that a plate surface extends along the substantially vertical direction (so that the plate surface faces the substantially horizontal direction). The cooling member 10 is disposed so as to face an axial end surface of the coil 4. Specifically, the cooling member 10 is disposed immediately in front of the coil end 4*a* on the front side.

In the motor 1 configured as described above, when the coil 4 is energized, a magnetic field is generated in the stator 3. When the magnetic field is generated in the stator 3, a rotational force is generated in the rotor 5 by the magnetic field, and the rotor 5 and the rotating shaft 6 rotate.

Further, when the coil 4 is energized, the coil 4 generates heat due to internal resistance. In the present embodiment, the oil is fed from the cooling member 10 to the coil 4 to cool the coil 4, in order to suppress occurrence of failures (such as degradation in efficiency).

Hereinafter, the configuration of the cooling member 10 is described in detail with reference to FIGS. 2 to 6.

The cooling member 10 is provided to feed the oil to the coil 4. The cooling member 10 is formed by fixing a first plate part 20 and a second plate part 40 to each other. Hereinafter, the first plate part 20 and the second plate part 40 are specifically described.

Figure 2:
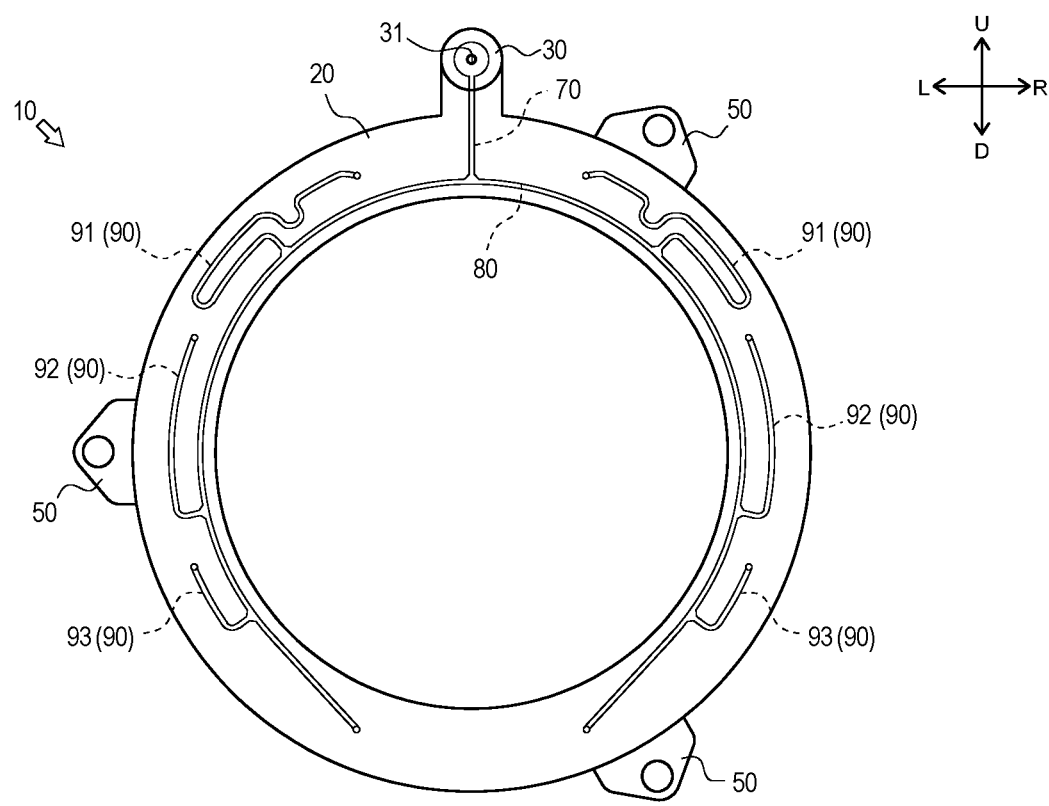
FIG. 2 is a front view showing the cooling member.
Figure 3A:
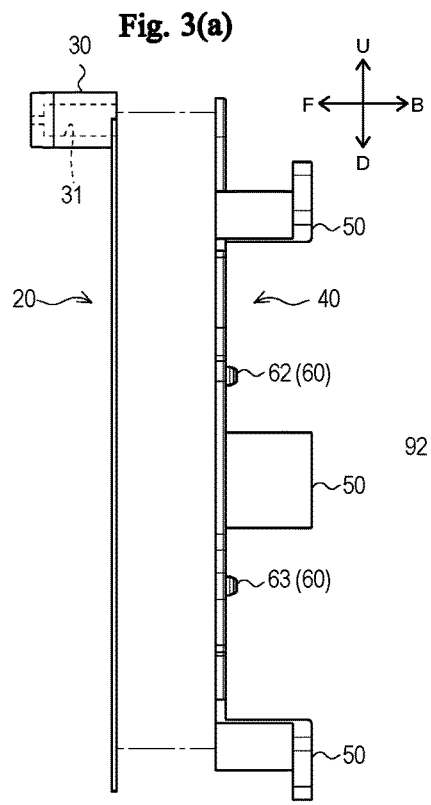
FIG. 3A is an exploded side view showing the cooling member and FIG. 3B is a back view showing the cooling member.
Figure 3B:
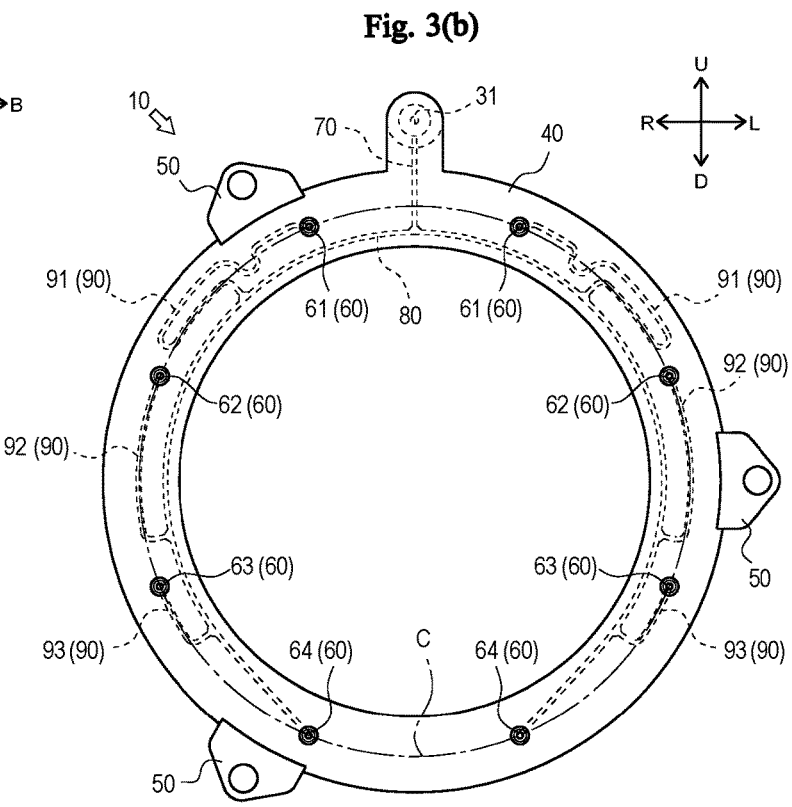

The first plate part 20 shown in FIGS. 2 and 3 is a member that forms a front side portion of the cooling member 10. The first plate part 20 is formed in a substantially annular plate shape with a plate surface oriented in the front-back direction. The first plate part 20 is mainly formed with a protruding part 30.

The protruding part 30 is a portion protruding forward from the first plate part 20. The protruding part 30 is formed at an upper end of the first plate part 20. The protruding part 30 is formed in a substantially columnar shape with an axis of the protruding part 30 oriented in the front-back direction. An oil feed port 31 is formed in the protruding part 30.

The oil feed port 31 is a portion that receives the oil that is fed into the cooling member 10. The oil feed port 31 is formed so as to penetrate the center of the protruding part 30 in the front-back direction.

The second plate part 40 shown in FIG. 3 is a member that forms a back side portion of the cooling member 10. The second plate part 40 is formed in a substantially annular plate shape with a plate surface oriented in the front-back direction. An outer shape of the second plate part 40 in front view (back view) is formed to be substantially the same as an outer shape of the first plate part 20. The second plate part 40 is mainly formed with fixing parts 50, discharge ports 60, a communication oil passage 70, a basis oil passage 80, and derived oil passages 90. In the following, the peripheral direction of the second plate part 40 may be simply referred to as the "peripheral direction", and the radial direction of the second plate part 40 may be simply referred to as the "radial direction".

The fixing parts 50 are portions for fixing the second plate part 40 to the housing 2.

The fixing parts 50 are formed so as to protrude backward from the second plate part 40. Three pieces of the fixing parts 50 are formed on an outer periphery of the second plate part 40 at equal intervals (every 120 degrees in front view (back view)). Each of the fixing parts 50 is formed in a plate shape that is bent substantially in an L shape.

The discharge ports 60 are portions that discharge the oil fed through the oil passage (the communication oil passage 70 and the like) described later toward the coil end 4*a*. The discharge ports 60 are formed so as to penetrate the second plate part 40 in the front-back direction. The discharge ports 60 are formed in plural numbers at equal intervals on the same circumference (on a virtual circle C whose center coincides with the center of the second plate part 40) along the peripheral direction of the second plate part 40. In the present embodiment, eight pieces of the discharge ports 60 are formed every 45 degrees along the peripheral direction of the second plate part 40. The plurality of discharge ports 60 are formed substantially at the center in a radial width of the second plate part 40 (substantially at the middle between the outer periphery and the inner periphery of the second plate part 40). The plurality of discharge ports 60 are disposed symmetrically with respect to the communication oil passage 70 described later.

In the present embodiment, for convenience of description, among the plurality of discharge ports 60, a pair of left and right discharge ports 60 disposed at the top are referred to as first discharge ports 61, a pair of left and right discharge ports 60 disposed below the first discharge ports 61 are referred to as second discharge ports 62, a pair of left and right discharge ports 60 disposed below the second discharge ports 62 are referred to as third discharge ports 63, and a pair of left and right discharge ports 60 disposed at the bottom are referred to as fourth discharge ports 64, respectively.

More specifically describing positions of the discharge ports 60 formed on a right side of the second plate part 40, the first discharge port 61 is formed at a position displaced by 22.5 degrees clockwise in front view with reference to the vertically upward direction of the second plate part 40. The second discharge port 62 is formed at a position further displaced from the first discharge port 61 clockwise in front view by 45 degrees. The third discharge port 63 is formed at a position further displaced by 45 degrees clockwise in front view from the second discharge port 62. The fourth discharge port 64 is formed at a position further displaced by 45 degrees clockwise in front view from the third discharge port 63.

The communication oil passage 70, the basis oil passage 80, and the derived oil passages 90 shown in FIG. 4 are oil passages for guiding the oil fed from the oil feed port 31 of the first plate part 20 to the discharge ports 60. The communication oil passage 70, the basis oil passage 80, and the derived oil passages 90 are formed by denting a front surface of the second plate part 40. In the present embodiment, it is assumed that the communication oil passage 70, the basis oil passage 80, and the derived oil passages 90 are formed to have substantially the same width and depth (the same cross-sectional shape). Hereinafter, each oil passage is specifically described.

The communication oil passage 70 is an oil passage that communicates the oil feed port 31 of the first plate part 20 with the basis oil passage 80. The communication oil passage 70 is formed so as to extend linearly in the up-down direction from an upper end of the second plate part 40 (a position facing the oil feed port 31) toward the vicinity of the inner periphery of the second plate part 40.

Figure 5:
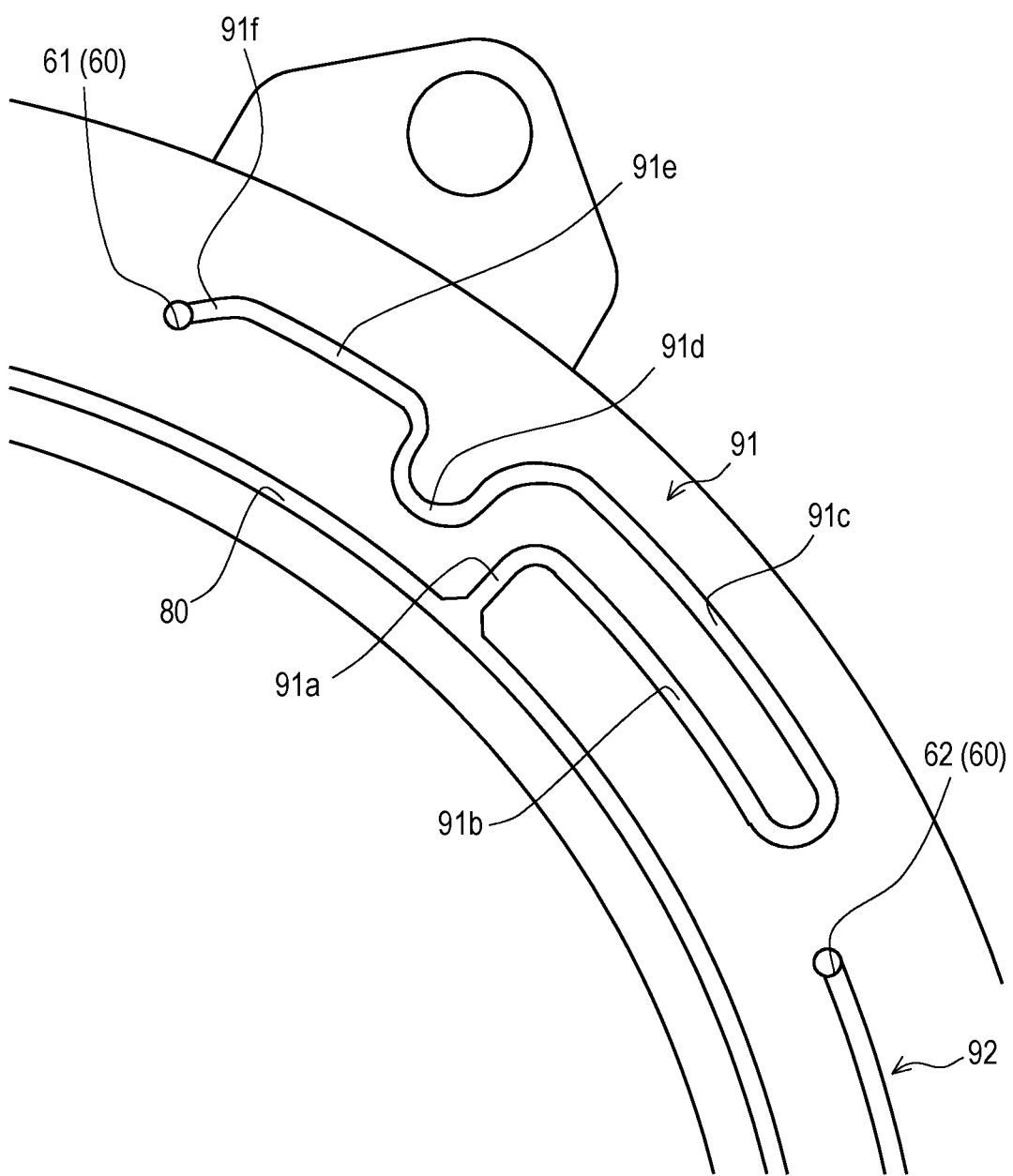
FIG. 5 is an enlarged front view showing a first derived oil passage.

The basis oil passage 80 shown in FIGS. 4 and 5 is an oil passage that guides the oil fed from the communication oil passage 70 along the peripheral direction of the second plate part 40. The basis oil passage 80 is formed so as to branch left and right from a lower end of the communication oil passage 70. The basis oil passage 80 is formed in a substantially circular arc shape along the peripheral direction of the second plate part 40. The basis oil passage 80 is formed so as to pass through the inner side of the first discharge ports 61, the second discharge ports 62, and the third discharge ports 63. Left and right lower ends of the basis oil passage 80 are formed so as to communicate with the left and right fourth discharge ports 64, respectively. The left and right lower ends of the basis oil passage 80 are formed so as not to communicate with each other. Thereby, the basis oil passage 80 is formed in a substantially C-shape opening downward in front view. The basis oil passage 80 is formed to be symmetrical with respect to the communication oil passage 70 (see FIGS. 2 and 3).

The derived oil passages 90 are formed so as to branch off from the basis oil passage 80, and connect the basis oil passage 80 and the discharge ports 60. The derived oil passages 90 are formed in plural numbers so as to correspond to the plurality of discharge ports 60. In the present embodiment, six pieces of the derived oil passages 90 are formed corresponding to the first discharge ports 61, the second discharge ports 62, and the third discharge ports 63 (see FIGS. 2 and 3).

In the present embodiment, for convenience of description, a pair of left and right derived oil passages 90 connected to the first discharge ports 61 are referred to as first derived oil passages 91, a pair of left and right derived oil passages 90 connected to the second discharge ports 62 are referred to as second derived oil passages 92, a pair of left and right derived oil passages 90 connected to the third discharge ports 63 are referred to as third derived oil passages 93, respectively. Hereinafter, each of the derived oil passages 90 is specifically described.

Note that the pair of left and right derived oil passages 90 is formed so as to be symmetrical with respect to the communication oil passage 70. Therefore, hereinafter, the derived oil passages 90 on the right side are specifically described, and the description of the derived oil passages 90 on the left side are appropriately omitted.

The first derived oil passage 91 shown in FIGS. 4 and 5 connects the basis oil passage 80 and the first discharge port 61. Hereinafter, the first derived oil passage 91 is divided into a plurality of portions (an introduction part 91a, a first circular arc part 91b, second circular arc part 91c, a curved part 91d, a third circular arc part 91e, and a communication part 91o, and the description is made separately for each portion.

The introduction part 91a is a portion that extends linearly and radially outward from the basis oil passage 80. One end (radially inner end) of the introduction part 91a is connected to upper right of the basis oil passage 80 (between the first discharge port 61 and the second discharge port 62 in the peripheral direction). The other end side (radially outer side) of the introduction part 91a extends to substantially the center of the radial width of the second plate part 40.

The first circular arc part 91b is a portion extending in a circular arc shape from the introduction part 91a. One end of the first circular arc part 91b is connected to the other end (radially outer end) of the introduction part 91a. The other end side of the first circular arc part 91b extends toward the opposite side (clockwise side in front view) of the first discharge port 61. The first circular arc part 91b is formed along the peripheral direction of the second plate part 40.

The second circular arc part 91c is a portion that extends in a circular arc shape outside the first circular arc part 91b. One end of the second circular arc part 91c is connected so as to be folded back to the other end (end on the clockwise side in front view) of the first circular arc part 91b. The other end side of the second circular arc part 91c extends in the counterclockwise direction in front view. The second circular arc part 91c is formed along the peripheral direction of the second plate part 40.

The curved part 91d is a portion formed to be curved into an appropriate shape. The curved part 91d is formed to be curved in a substantially U-shape that opens radially outward in front view. One end of the curved part 91d is connected to the other end (end on the counterclockwise side in front view) of the second circular arc part 91c.

The third circular arc part 91e is a portion that extends in a circular arc shape from the curved part 91d. One end of the third circular arc part 91e is connected to the other end of the curved part 91d. The other end side of the third circular arc part 91e extends in the counterclockwise direction in front view. The third circular arc part 91e is formed along the peripheral direction of the second plate part 40.

The communication part 91f is a portion that communicates with the first discharge port 61. One end of the communication part 91f is connected to the other end of the third circular arc part 91e. The other end side of the communication part 91f extends linearly toward the first discharge port 61 and is connected to the first discharge port 61.

In the first derived oil passage 91, a flexure (a portion that is bent) is formed at a portion where each part (the introduction part 91a and the like) is connected to the other part. That is, the first derived oil passage 91 has flexures at a plurality of locations.

Figure 6:
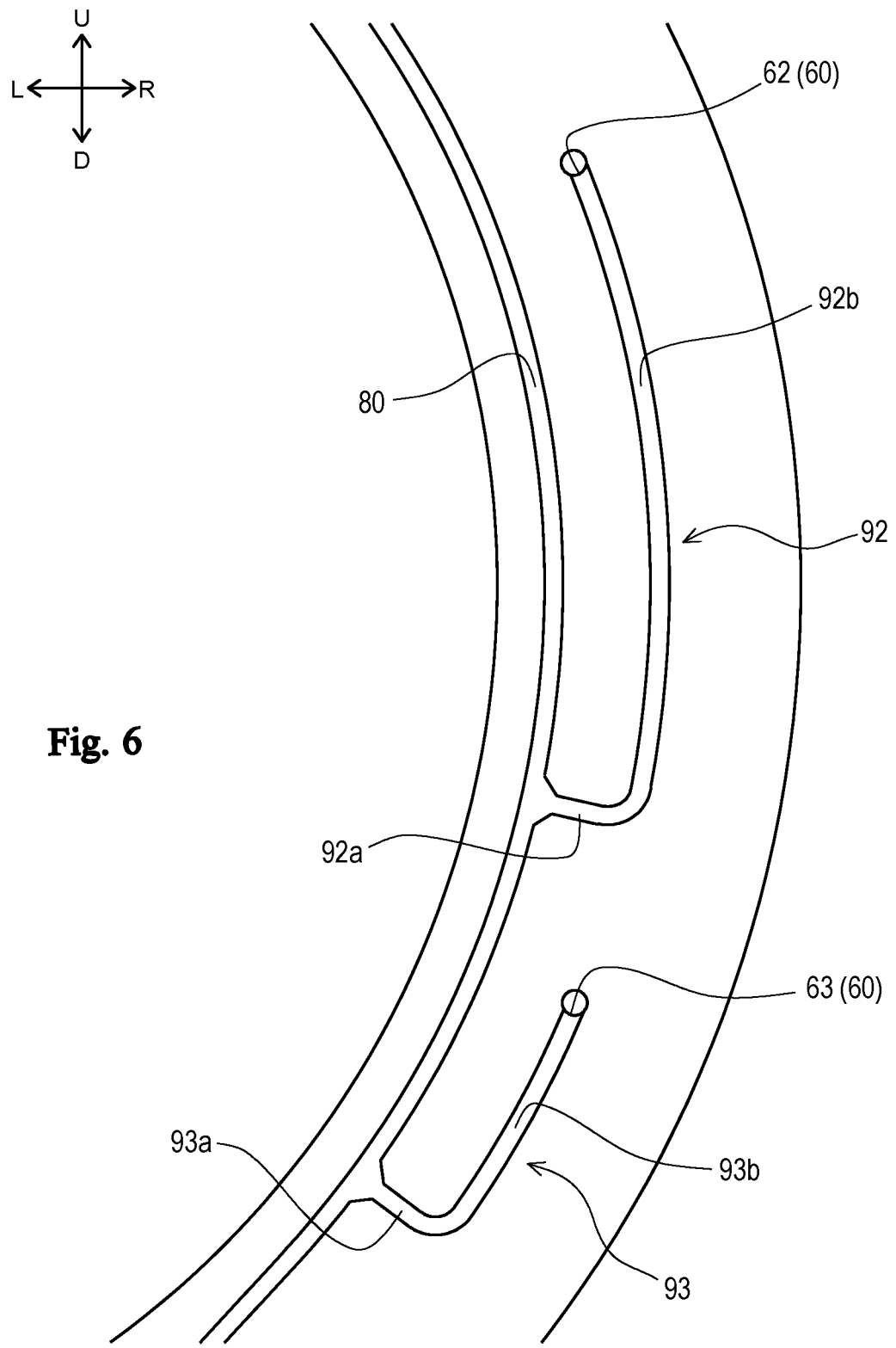
FIG. 6 is an enlarged front view showing a second derived oil passage and a third derived oil passage.

The second derived oil passage 92 shown in FIGS. 4 and 6 connects the basis oil passage 80 and the second discharge port 62. Hereinafter, the second derived oil passage 92 is divided into a plurality of portions (an introduction part 92a and a circular arc part 92b) and the description is made separately for each portion.

The introduction part 92a is a portion that extends linearly and radially outward from the basis oil passage 80 One end (radially inner end) of the introduction part 92a is connected to lower right of the basis oil passage 80 (between the second discharge port 62 and the third discharge port 63 in the peripheral direction). The other end side (radially outer side) of the introduction part 92a extends to substantially the center of the radial width of the second plate part 40.

The circular arc part 92b is a portion extending in a circular arc shape from the introduction part 92a. One end of the circular arc part 92b is connected to the other end (radially outer end) of the introduction part 92a. The other end of the circular arc part 92b is connected to the second discharge port 62. The circular arc part 92b is formed along the peripheral direction of the second plate part 40.

In the second derived oil passage 92, a flexure is formed at a portion where respective parts (the introduction part 92a and the circular arc part 92b) are connected to each other. That is, the second derived oil passage 92 has the flexure at one location.

The third derived oil passage 93 connects the basis oil passage 80 and the third discharge port 63. Hereinafter, the third derived oil passage 93 is divided into a plurality of portions (an introduction part 93a and a circular arc part 93b) and the description is made separately for each portion.

The introduction part 93a is a portion extending linearly and radially outward from the basis oil passage 80. One end (radially inner end) of the introduction part 93a is connected to lower right of the basis oil passage 80 (on the clockwise side of the third discharge port 63 in the peripheral direction). The other end side (radially outer side) of the introduction part 93a extends to substantially the center of the radial width of the second plate part 40.

The circular arc part 93b is a portion extending in a circular arc shape from the introduction part 93a. One end of the circular arc part 93b is connected to the other end (radially outer end) of the introduction part 93a. The other end of the circular arc part 93b is connected to the third discharge port 63. The circular arc part 93b is formed along the peripheral direction of the second plate part 40. The circular arc part 93b of the third derived oil passage 93 is formed shorter than the circular arc part 92b of the second derived oil passage 92.

In the third derived oil passage 93, a flexure is formed at a portion where the respective portions (the introduction part 93a and the circular arc part 93b) are connected to each other. That is, the third derived oil passage 93 has the flexure at one location.

As described above, the first derived oil passage 91, the second derived oil passage 92, and the third derived oil passage 93 are formed so as to have different shapes from each other.

As shown in FIGS. 2 and 3, the cooling member 10 is formed by fixing a back surface of the first plate part 20 and a front surface of the second plate part 40 described above to each other. Thereby, the oil passages (the communication oil passage 70, the basis oil passage 80, and the derived oil passages 90) formed on the front surface of the second plate part 40 are covered by the first plate part 20 from the front.

Next, a manner of cooling the coil 4 using the above-described cooling member 10 is described.

As shown in FIG. 1, the cooling member 10 is disposed in front of the coil 4 (the coil end 4a on the front side) in a state of being erected in the up-down direction. The cooling member 10 is disposed on the same axis as the coil 4. By disposing the cooling member 10 in this way, the discharge ports 60 formed in the cooling member 10 are disposed so as to face the coil end 4a in the front-back direction.

The oil is fed to the oil feed port 31 of the cooling member 10 by an oil pump (not shown). As shown in FIG. 4, the oil is guided to the upper end of the basis oil passage 80 through the communication oil passage 70, and branches left and right along the basis oil passage 80 to flow through the basis oil passage 80. The oil circulating in the basis oil passage 80 branches into and flows through the plurality of derived oil passages 90 (the first derived oil passage 91, the second derived oil passage 92, and the third derived oil passage 93) connected to the basis oil passage 80, respectively. In this way, the oil is guided through the plurality of derived oil passages 90 to the first discharge port 61, the second discharge port 62, and the third discharge port 63. The oil that has flowed to the downstream end (lower end) of the basis oil passage 80 is guided to the fourth discharge port 64. The oil guided to each discharge port 60 is discharged backward through the discharge port 60. As a result, the oil is fed to the coil end 4a disposed on the back of the cooling member 10, and the coil 4 can be cooled by the oil (see FIG. 1).

Here, in general, the pressure loss of the oil flowing through the oil passage increases as a distance that the oil flows increases. For example, as in JP 5347380 B2, in the case in which the plurality of discharge ports (injection holes) are formed along the peripheral oil passage, there is a difference in the distance from the oil inlet port to each of the discharge ports. This causes the discharge pressure of the oil to increase at the discharge port located nearer to the oil inlet port, and the discharge pressure of the oil to decrease at the discharge port located farther from the oil inlet port. When the discharge pressures of the respective discharge ports are different as described above, the amounts of oil discharged from the respective discharge ports are also different, and the coil end 4a may not be cooled as desired.

Therefore, the cooling member 10 according to the present embodiment arbitrarily adjusts the amount of oil discharged from each discharge port 60 by forming the plurality of derived oil passages 90 having different shapes.

Specifically, among the derived oil passages 90, the first derived oil passage 91 connected to the most upstream side of the basis oil passage 80 (a portion closest to the oil feed port 31) is formed so as to have more flexures and longer total length than the other derived oil passages 90 (the second derived oil passage 92 and the third derived oil passage 93). With the above configuration, the pressure loss of the oil flowing through the first derived oil passage 91 becomes greater than the pressure loss of the oil flowing through the other derived oil passages 90.

In the basis oil passage 80, the second derived oil passage 92 connected to the downstream side of the first derived oil passage 91 has a shape relatively similar to a shape of the third derived oil passage 93 connected to the further downstream side of the first derived oil passage 91. However, the second derived oil passage 92 is formed so as to have the total length longer than the total length of the third derived oil passage 93. With the above configuration, the pressure loss of the oil flowing through the second derived oil passage 92 becomes greater than the pressure loss of the oil flowing through the third derived oil passage 93.

Further, the oil is fed to the fourth discharge port 64 directly from the basis oil passage 80 without passing through the above-described derived oil passages 90. In other words, the oil fed to the fourth discharge port 64 farthest from the oil feed port 31 is not provided with the derived oil passage 90 that increases the pressure loss.

As described above, in the present embodiment, the oil fed to the respective discharge ports 60 is provided with different amounts of pressure loss using the derived oil passages 90 having different shapes, so that the amount of oil discharged from each discharge port 60 is arbitrarily adjusted. Specifically, the derived oil passage 90 closer to the oil feed port 31 is shaped so as to generate a greater pressure loss in the oil flowing therethrough, thereby achieving equalization of the discharge pressure of oil at the respective discharge ports 60. Thus, the amount of oil discharged from the respective discharge ports 60 can be equalized.

As described above, the cooling member 10 of the motor 1 according to the present embodiment includes:

the oil feed port 31 to which oil is fed;

the plurality of discharge ports 60 that discharge the oil toward the motor 1 (more specifically, the coil 4 of the motor 1);

the basis oil passage 80 connected to the oil feed port 31; and the plurality of derived oil passages 90 each of which is formed by branching from the basis oil passage 80 so as to correspond to each of the plurality of discharge ports 60 and is formed so as to connect the basis oil passage 80 to each of the discharge ports 60, and which are formed in different shapes from each other.

With the above configuration, the amount of oil discharged from the plurality of discharge ports 60 can be arbitrarily adjusted. That is, the pressure loss of the oil fed to the respective discharge ports 60 can be adjusted by the derived oil passages 90 having different shapes. For example, by appropriately determining a shape of the derived oil passage 90 according to a position of the discharge port 60 and each oil passage, the amounts of oil discharged (discharge amount) from the discharge ports 60 can be equalized.

Further, the plurality of derived oil passages 90 are formed in shapes such that the pressure loss of the oil that flows increases as a distance from the oil feed port 31 decreases.

With the above configuration, the amounts of oil discharged from the plurality of discharge ports 60 can be equalized. In other words, in general, as the distance from the oil feed port 31 to the discharge port 60 decreases, the pressure loss decreases and the amount of oil discharged from the discharge port 60 increases. Therefore, by forming the derived oil passage 90 closer to the oil feed port 31 to have a shape that generates greater pressure loss, the pressure losses can be equalized, and the amounts of oil discharged can be equalized.

Further, the plurality of derived oil passages 90 differ from each other in at least one of the length in the oil flow direction, the number of flexures, and the cross-sectional shape perpendicular to the oil flow direction.

With the above configuration, a difference can be provided between the pressure losses of the plurality of derived oil passages 90.

Next, a cooling member 110 according to a second embodiment is described with reference to FIGS. 7 and 8.

The main difference between the cooling member 110 according to the second embodiment and the cooling member 10 according to the first embodiment is the layout of discharge ports 60. Therefore, the layout of the discharge ports 60 of the cooling member 110 according to the second embodiment is specifically described below.

Figure 7:
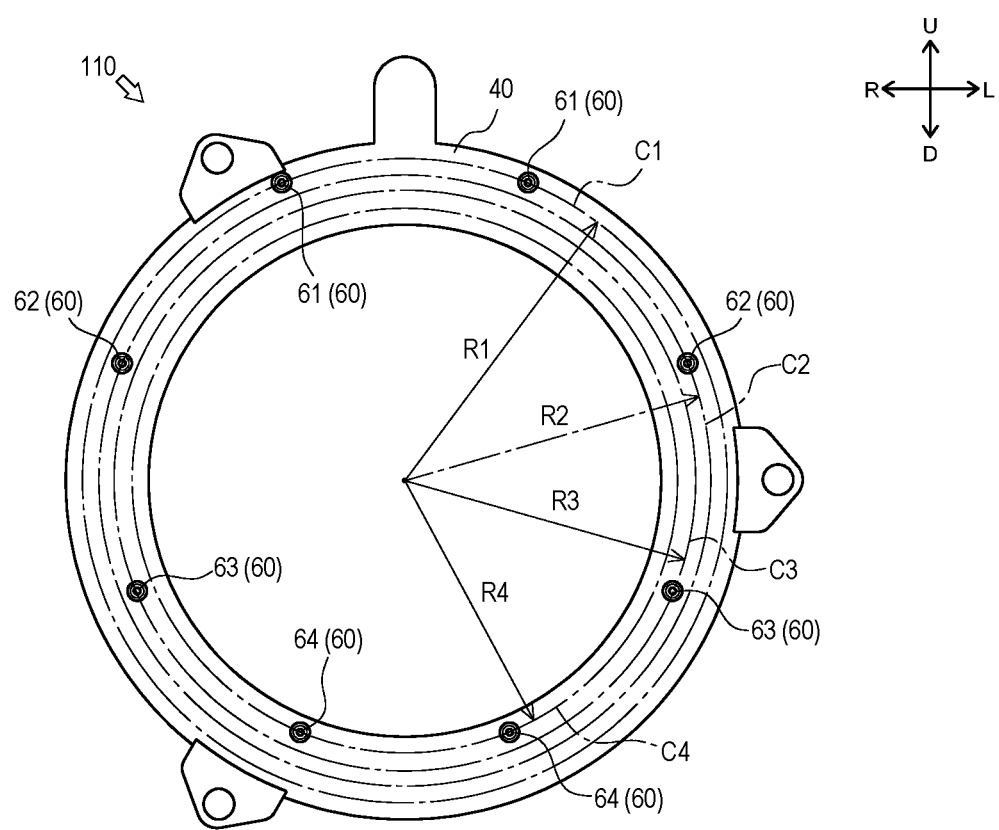
FIG. 7 is a back view showing a cooling member according to a second embodiment.

As shown in FIG. 7, the respective discharge ports 60 of the cooling member 110 are disposed at different positions in the radial direction.

Specifically, the first discharge ports 61 are disposed on a virtual circle C1 having a radius R1 whose center coincides with the center of the second plate part 40. Further, the second discharge ports 62 are disposed on a virtual circle C2 having a radius R2 whose center coincides with the center of the second plate part 40. The radius R2 of the virtual circle C2 is smaller than the radius R1 of the virtual circle C1.

Further, the third discharge ports 63 are disposed on a virtual circle C3 having a radius R3 whose center coincides with the center of the second plate part 40. The radius R3 of the virtual circle C3 is smaller than the radius R2 of the virtual circle C2. Further, the fourth discharge ports 64 are disposed on a virtual circle C4 having a radius R4 whose center coincides with the center of the second plate part 40. The radius R4 of the virtual circle C4 is smaller than the radius R3 of the virtual circle C3.

In this manner, the discharge ports 60 of the cooling member 110 are disposed such that the discharge port 60 positioned lower is positioned more radially inward of the second plate part 40.

Next, a manner of cooling the coil 4 using the above-described cooling member 110 is described.

Figure 8:
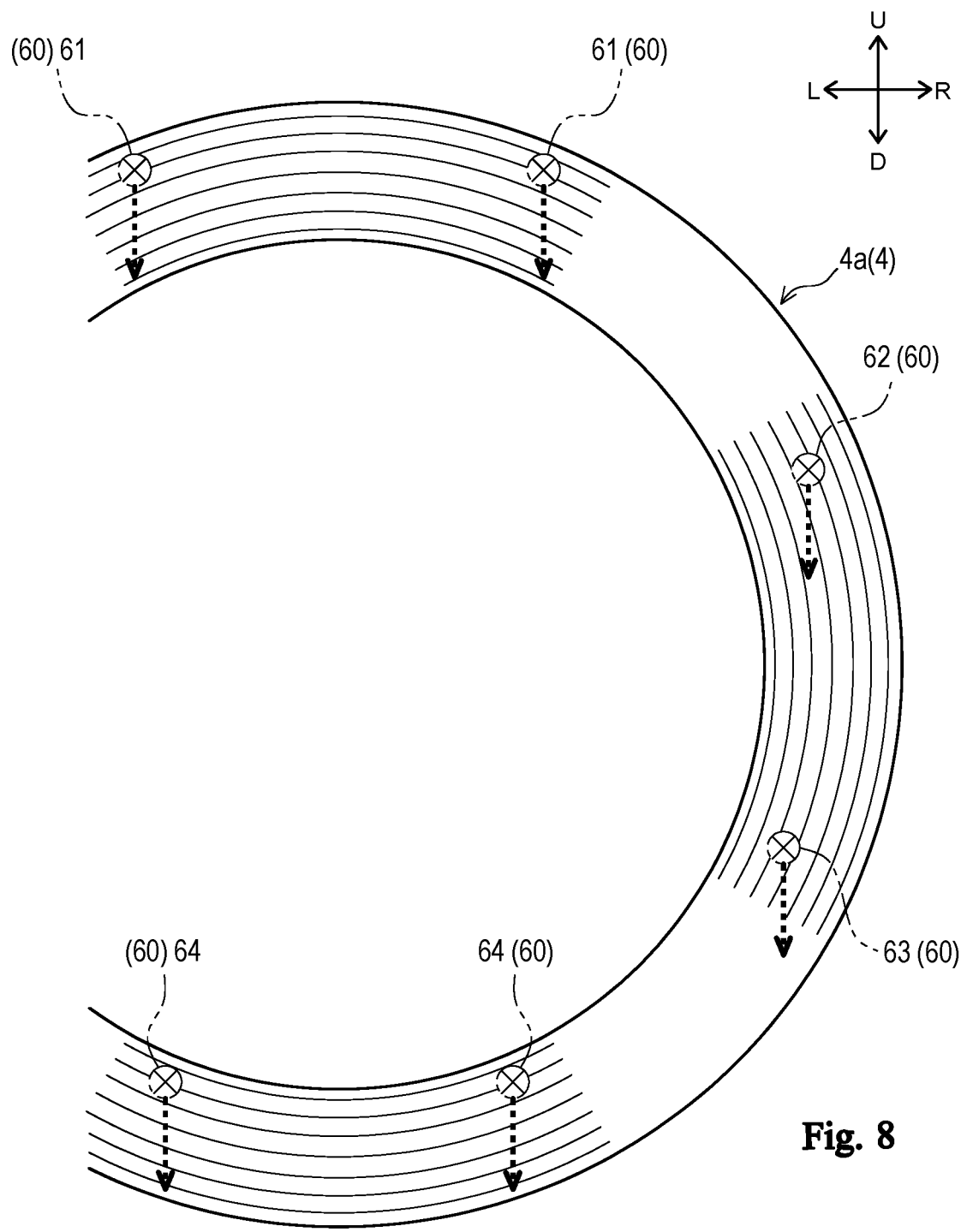
FIG. 8 is a front view showing a relative positional relationship of discharge ports with respect to a coil.

FIG. 8 shows an axial end surface of the coil 4 (coil end 4a) and a relative positional relationship of the discharge ports 60 of the cooling member 110 with respect to the end surface. As described above, the discharge ports 60 are disposed such that the discharge port 60 positioned lower is positioned more radially inward of the second plate part 40. For this reason, also with respect to the end surface of the coil 4, the discharge ports 60 are disposed such that the discharge port 60 positioned lower is positioned more radially inward of the coil 4.

For example, the first discharge ports 61 are disposed at the upper part of the coil 4 so as to be positioned on the radially outer side of the coil 4. Therefore, the oil discharged from the first discharge ports 61 is fed to the vicinity of the outer periphery of the coil 4, and then flows down (that is, to the inner peripheral side) along the end surface of the coil 4 following the gravity. In this way, the oil discharged from the first discharge ports 61 is fed over a wide range from the vicinity of the outer periphery to the vicinity of the inner periphery of the end surface of the coil 4. Thereby, the coil 4 can be effectively cooled.

Further, the fourth discharge ports 64 are disposed at the lower part of the coil 4 so as to be positioned on the radially inner side of the coil 4. Therefore, the oil discharged from the fourth discharge ports 64 is fed to the vicinity of the inner periphery of the coil 4, and then flows down (that is, to the outer peripheral side) along the end surface of the coil 4 following the gravity. In this way, the oil discharged from the fourth discharge ports 64 is fed over a wide range from the vicinity of the inner periphery to the vicinity of the outer periphery of the end surface of the coil 4. Thereby, the coil 4 can be effectively cooled.

As described above, by adjusting the radial positions of the respective discharge ports 60 in consideration of the direction of gravity, the oil can be fed to the wide range of the end surface of the coil 4. That is, by disposing the discharge ports 60 facing an upper half of the coil 4 to be positioned in the vicinity of the outer periphery of the coil 4 and the discharge ports 60 facing a lower half of the coil 4 to be positioned in the vicinity of the inner periphery of the coil 4, the oil can be fed over the wide range of the end surface of the coil 4.

As described above, in the cooling member 110 according to the present embodiment, the plurality of discharge ports 60 are
disposed so as to face the axial end surface of the motor 1 (more specifically, the coil 4 of the motor 1), and
disposed at different positions from each other in the radial direction of the motor 1.

With this configuration, the motor 1 (the coil 4) can be cooled at an arbitrary position. That is, the coil 4 can be arbitrarily cooled by arbitrarily adjusting the radial positions of the plurality of discharge ports 60 according to the purpose (a desired cooling position or the like).

Figure 9:
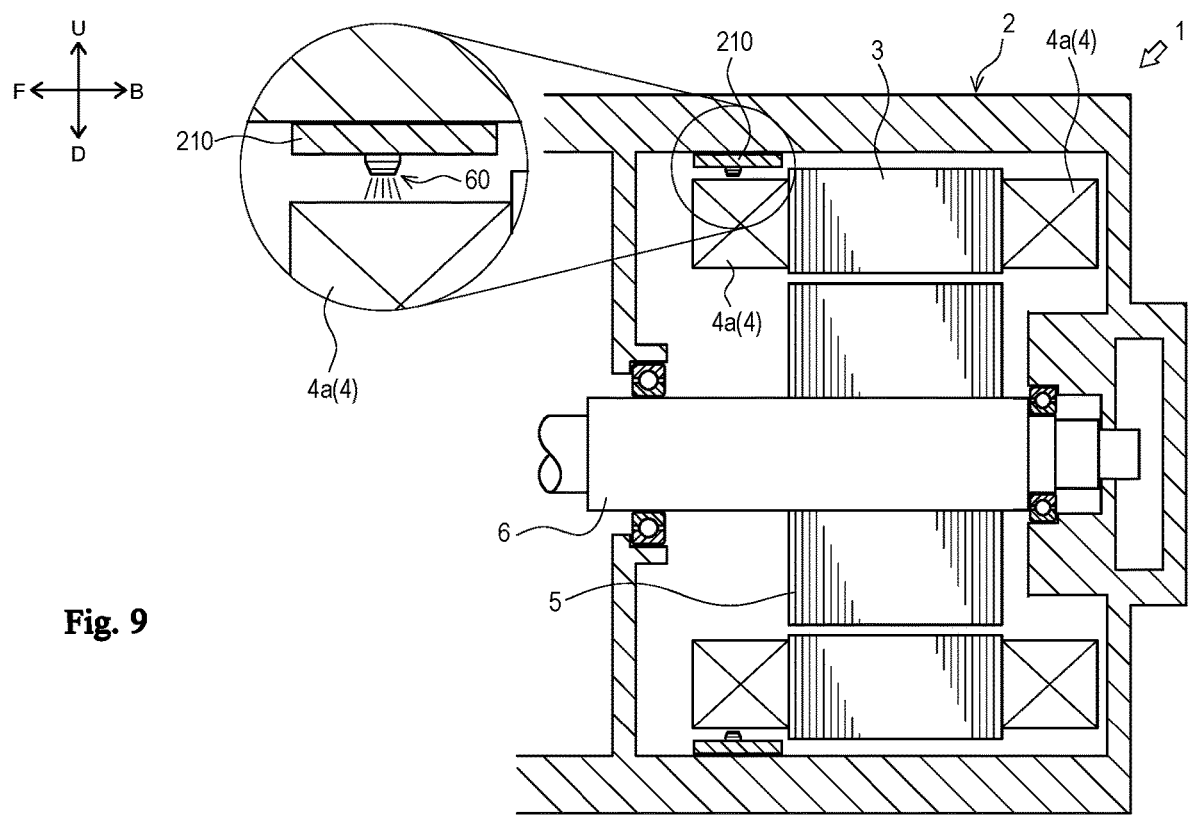
FIG. 9 is a schematic side cross-sectional view of a motor including a cooling member according to a third embodiment.

Next, a cooling member 210 according to a third embodiment is described with reference to FIG. 9.

The cooling member 210 according to the third embodiment is different from the cooling member 10 according to the first embodiment in that the oil is discharged not to the axial end surface of the coil 4 but to a side surface (radially outer side surface) of the coil 4.

Specifically, the cooling member 210 is formed in a cylindrical shape so as to surround the coil 4 (coil end 4a) from the outside. Discharge ports 60 are provided on an inner peripheral surface of the cooling member 210. With this configuration, the oil is discharged toward the inner side of the cooling member 210 through the discharge ports 60. The oil discharged from the cooling member 210 is fed to the side surface of the coil 4, and can cool the coil 4.

Note that, similarly to the cooling member 10 according to the first embodiment, a basis oil passage 80 and derived oil passages 90 that guide the oil to the discharge ports 60 are also formed in the cooling member 210. By forming the derived oil passage 90 closer to an oil feed port 31 into a shape that generates a greater pressure loss, it is possible to equalize the amounts of oil discharged from the respective discharge ports 60.

As described above, in the cooling member 210 according to the present embodiment, the plurality of discharge ports 60 are disposed so as to face the radially outer side surface of the motor 1 (more specifically, the coil 4 of the motor 1).

With this configuration, the motor 1 (the coil 4) can be cooled from the side surface.

As described above, the embodiments of the present disclosure have been described, but the present disclosure is not limited to the above configuration, and various changes can be made within the scope of the invention described in the claims.

For example, in the above embodiments, the cooling member 10 is disposed in front of the coil 4 to cool the coil end 4a on the front side, however, the cooling member 10 may be disposed in the back of the coil 4 to cool the coil end 4a on the back side. Further, the cooling members 10 may be disposed in front and back of the coil 4 to cool the coil ends 4a on both the front and back sides.

Further, the shapes of the basis oil passage 80 and the derived oil passages 90 are not limited to the shapes according to the above embodiments, but may be arbitrary shapes. Further, in the above embodiments, the respective derived oil passages 90 are formed so as to have different lengths (total lengths) and different number of flexures, but the present disclosure is not limited to this. For example, the pressure loss of the oil that flows can be adjusted by forming the cross-sectional shapes of the derived oil passages 90 perpendicular to the oil flow direction to be different from each other.

Further, the numbers and positions of the discharge ports 60 and the derived oil passages 90 are not limited to those according to the above embodiments, and can be arbitrarily changed.

Further, in the above embodiments, the housing 2 of the motor 1 and the cooling member 10 are provided separately, but the present disclosure is not limited to this. For example, the cooling member 10 can be formed integrally with the housing 2 of the motor 1. Specifically, it is also possible to form oil passages (a basis oil passage 80, derived oil passages 90, and so on) and discharge ports (discharge ports 60) for guiding the oil in the housing 2.

Further, in the above embodiments, the coil 4 is disposed with the axis oriented in the front-back direction, however, the present disclosure is not limited to this. That is, the orientation of the layout of the coil 4 can be arbitrarily changed. Further, in the above embodiments, the plate surface of the cooling member 10 is disposed so as to extend substantially along the vertical direction, however, the present disclosure is not limited to this. That is, the cooling member 10 can be disposed in an arbitrary direction according to the direction of the coil 4 and the like.

Further, by simultaneously using the cooling member 10 (see FIG. 1) according to the first embodiment and the cooling member 210 (see FIG. 9) according to the third embodiment, the oil can be fed to the coil 4 from a plurality of directions. Further, in this case, the cooling member 10 and the cooling member 210 can be constituted of a single member.

Further, in the above embodiments, an example has been described in which the oil is fed to the coil 4 of the motor 1 to cool the motor 1 (the coil 4), however, the present disclosure is not limited to this. That is, the present disclosure only needs to be able to cool the motor 1, and the feeding destination of the oil is not limited to the coil 4. For example, the oil can be fed to members other than the coil 4 constituting the motor 1 to cool the members.

Further, in the above embodiments, the motor 1 is used for the driving device of the automobile, however, the present disclosure is not limited to this, and can be used for an arbitrary purpose.

What is claimed is:

1. A motor housing comprising:
an oil feed port to which oil is fed;
a plurality of discharge ports that discharge oil toward a motor;
a basis oil passage connected to the oil feed port; and
a plurality of derived oil passages, each of the plurality of derived oil passages being formed by branching from the basis oil passage so as to correspond to each of the plurality of discharge ports and being formed so as to connect the basis oil passage to each of the discharge ports, and the plurality of derived oil passages being formed in different shapes from each other, the plurality of derived oil passages are formed in shapes such that a pressure loss of the oil flowing through one derived oil passage in the plurality of derived oil passages is greater than a pressure loss of oil flowing through other derived oil passages that are farther from the oil feed port than the one derived oil passage.

2. The motor housing according to claim 1,
wherein the plurality of derived oil passages are formed in shapes such that a pressure loss of the oil that flows increases as a distance from the oil feed port decreases.

3. The motor housing according to claim 2,
wherein the plurality of derived oil passages differ from each other in at least one of a length in an oil flow direction, a number of flexures, and a cross-sectional shape perpendicular to the oil flow direction.

4. The motor housing according to claim 3,
wherein the plurality of discharge ports are disposed so as to face an axial end surface of the motor, and
wherein the plurality of discharge ports are disposed at different positions in a radial direction of the motor.

5. The motor housing according to claim 3,
wherein the plurality of discharge ports are disposed so as to face a radially outer side surface of the motor.

6. The motor housing according to claim 2,
wherein the plurality of discharge ports are disposed so as to face an axial end surface of the motor, and
wherein the plurality of discharge ports are disposed at different positions in a radial direction of the motor.

7. The motor housing according to claim 2,
wherein the plurality of discharge ports are disposed so as to face a radially outer side surface of the motor.

8. The motor housing according to claim 1,
wherein the plurality of derived oil passages differ from each other in at least one of a length in an oil flow direction, a number of flexures, and a cross-sectional shape perpendicular to the oil flow direction.

9. The motor housing according to claim 8,
wherein the plurality of discharge ports are disposed so as to face an axial end surface of the motor, and
wherein the plurality of discharge ports are disposed at different positions in a radial direction of the motor.

10. The motor housing according to claim 8,
wherein the plurality of discharge ports are disposed so as to face a radially outer side surface of the motor.

11. The motor housing according to claim 1,
wherein the plurality of discharge ports are disposed so as to face an axial end surface of the motor, and
wherein the plurality of discharge ports are disposed at different positions in a radial direction of the motor.

12. The motor housing according to claim 1,
wherein the plurality of discharge ports are disposed so as to face a radially outer side surface of the motor.

\* \* \* \* \*